United States Patent
You et al.

(10) Patent No.: US 9,323,116 B2
(45) Date of Patent: Apr. 26, 2016

(54) LIQUID CRYSTAL DISPLAY DEVICE AND FABRICATION METHOD THEREOF

(71) Applicant: LG Display Co., Ltd., Seoul (KR)

(72) Inventors: Jae Hyun You, Goyang-si (KR); Chul Sang Shin, Paju-si (KR)

(73) Assignee: LG Display Co., Ltd., Seoul (KR)

( * ) Notice: Subject to any disclaimer, the term of this patent is extended or adjusted under 35 U.S.C. 154(b) by 0 days.

(21) Appl. No.: 14/330,513

(22) Filed: Jul. 14, 2014

(65) Prior Publication Data

US 2015/0062522 A1    Mar. 5, 2015

(30) Foreign Application Priority Data

Aug. 29, 2013 (KR) .................. 10-2013-0103159

(51) Int. Cl.
    *G02F 1/1343*    (2006.01)
(52) U.S. Cl.
    CPC .............. *G02F 1/134363* (2013.01); *G02F 2001/134318* (2013.01); *G02F 2001/134372* (2013.01)

(58) Field of Classification Search
    CPC .............. G02F 1/134363; G02F 2001/134372; G02F 2001/134318
    USPC .......................................... 349/141
    See application file for complete search history.

(56) References Cited

U.S. PATENT DOCUMENTS

| 7,110,076 B2 * | 9/2006 | Shimizu et al. ............... 349/141 |
| 2010/0007837 A1 * | 1/2010 | Ham ................. G02F 1/134309 349/139 |

* cited by examiner

*Primary Examiner* — Charles Chang
(74) *Attorney, Agent, or Firm* — Fenwick & West LLP

(57) ABSTRACT

A pixel of an LCD device includes a gate line, a data line intersecting with the gate line, a gate insulation layer between the data line and the gate line, a thin film transistor formed at an intersection of the gate line and the data line, a planarization layer, a common electrode formed on the planarization layer, a pixel electrode formed over the common electrode, and an insulation layer between the common electrode and the pixel electrode. The common electrode is formed with groove extending along a region where the data line extends. Material of the common electrode is absent from the groove to reduce capacitance between the common electrode and the data line.

19 Claims, 3 Drawing Sheets

LIQUID CRYSTAL DISPLAY DEVICE AND FABRICATION METHOD THEREOF

CROSS-REFERENCE TO RELATED APPLICATION

The present application claims priority under 35 U.S.C. §119(a) to Korean Patent Application No. 10-2013-0103159 filed on Aug. 29, 2013, which is hereby incorporated by reference in its entirety.

BACKGROUND

1. Field of the Disclosure

The present application relates to a liquid crystal display device and a fabrication method thereof. More particularly, the present application relates to a liquid crystal display device and a fabrication method thereof that reduce capacitance on a data line and the delay of a data signal.

2. Description of the Related Art

Liquid crystal display (LCD) devices have advantages such as low driving voltage, low power consumption, and portability. Hence, the LCD devices are used in a variety of application fields including notebook computers, monitors, space ships, aircrafts and so on.

The LCD device includes lower and upper substrates and a liquid crystal layer interposed between the two substrates. Such LCD device adjusts light transmittance and displays an image, by controlling molecular alignment of the liquid crystal layer based on application of an electric field.

Depending on how the molecular alignment of the liquid crystal layer is controlled, LCD devices can be classified, for example, into a twisted nematic (TN) display, a vertical alignment (VA) display, an in-plane switching (IPS) display, and a fringe field switching (FFS) display.

In the IPS and FFS devices, both pixel and common electrodes are arranged on a lower substrate. Also, the IPS and FFS devices control the molecular alignment of the liquid crystal layer using an electric field between the pixel electrode and the common electrode.

In detail, the IPS devices generate a lateral electric field between the pixel electrode and the common electrode which are arranged alternately with and parallel to each other, in order to control liquid crystal molecular alignment of the liquid crystal layer. The FFS devices separate the pixel electrode and the common electrode using an insulation layer which is formed between the two electrodes. Also, the FFS devices allow one of the pixel electrode and the common electrode to be formed in a plate shape but also the other to be formed in a finger shape. Such a FFS devices control liquid crystal molecular alignment of the liquid crystal layer using a fringe electric field generated between the two electrodes.

An LCD device of the FFS mode may include a liquid crystal panel configured with a thin film transistor array substrate and a color filter array substrate which face the thin film transistor array substrate. The thin film transistor array substrate and the color filter array substrate can be adhered to each other by a sealant formed between the two substrates.

The thin film transistor array substrate includes the common electrode and pixel electrode formed to have an insulation layer therebetween. The liquid crystal layer is driven by the electric field formed between the common electrode and the pixel electrode. In detail, molecular alignment of the liquid crystal layer is adjusted according to a direction of the electric field which is formed between the common electrode and the pixel electrode.

Also, the thin film transistor array substrate includes gate and data lines that intersect with each other. The gate and data lines define a pixel region, and a thin film transistor is formed at each intersection of the gate and data lines. The thin film transistor is electrically connected to the pixel electrode. Meanwhile, the color filter array substrate includes a black matrix, a color filter layer and an overcoat layer sequentially formed on it.

The common electrode with the plate shape is formed on the entire surface of the thin film transistor array substrate provided with the gate and data lines and the thin film transistor. Also, the common electrode is formed in such a manner as to overlap with the data line. Insulation layers such as a passivation layer, a planarization layer and so on, are formed in an overlap region of the common electrode and the data line. In other words, the insulation layers are interposed between the common electrode and the data line.

SUMMARY

Embodiments relate to a liquid crystal display device including a gate line, a data line, a thin film transistor, a planarization layer, a common electrode and a pixel electrode. The gate line is formed on an insulation substrate. The data line is formed to intersect with the gate line to define a pixel region. The thin film transistor is formed at an intersection of the gate line and the data line. The planarization is layer formed on the substrate, the data line and the thin film transistor. The common electrode is formed on the planarization layer and formed with a plurality of perforations within a region corresponding to the data line. Each of the perforations has a width smaller than a width of the data line. The plurality of perforations reduce capacitance between data line and the common electrode. The pixel electrode is formed over the common electrode.

In one or more embodiments, the common electrode is formed over an entire pixel region.

In one or more embodiments, the liquid crystal display device further includes a common line which is formed in the same layer and formed with a same material as the gate line and connected to the common electrode through a contact hole.

In one or more embodiments, the pixel electrode is connected to the thin film transistor through a contact hole. A groove is formed within a region of the contact hole for connecting the thin film transistor to the pixel electrode.

Embodiments also relate to a method of fabricating a liquid crystal display device. A gate line and a gate electrode branching from the gate line on an insulation substrate is formed. A gate insulation layer is formed on the substrate formed with the gate line and the gate electrode. A semiconductor layer, source and drain electrodes and a data line is formed on the gate insulation layer. A planarization layer is formed on the substrate formed with the source and drain electrode and the data line. On the planarization layer, a common electrode is formed. A plurality of perforations is formed in a region within the common electrode to reduce capacitance between the common electrode and the data line. Each of the perforations has a width narrower than a width of the data line. An insulation layer is formed on the common electrode. A pixel electrode is formed on the insulation layer.

In one or more embodiments, a common line is formed in the same layer and formed of the same material as the gate line and electrode. A contact hole is formed after forming the planarization layer to connect the common electrode to the common line through the contact hole.

In one or more embodiments, a contact hole is formed after forming the insulation layer to connect the pixel electrode to the drain electrode.

In one or more embodiments, the common electrode is formed to allow a groove to be formed within a region in the common electrode where the contact hole for connecting the pixel electrode and the drain electrode is formed.

Embodiments also relate to a liquid crystal display device including an array of pixels. Each of the pixels includes a gate line, a data line and a common electrode. The data line intersects with the gate line to define a pixel region of each of the pixels in conjunction with the gate line. The common electrode is formed with a plurality of perforations extending along the data line. Each of the perforations has a width narrower than a width of the data line. Material of the common electrode is absent from the perforations to reduce capacitance between the common electrode and the data line.

In one or more embodiments, each of the pixels further includes a planarization layer between the data line and the common electrode.

In one or more embodiments, each of the pixels further includes a thin film transistor at an intersection of the gate line and the data line. The thin film transistor includes a gate electrode, a semiconductor layer, a source electrode and a drain electrode. The gate electrode is connected to the gate line. The semiconductor layer is placed over the gate electrode. The source electrode is connected to the data line. The common electrode is formed with a groove at a location corresponding to the drain electrode.

In one or more embodiments, the liquid crystal display device further includes a pixel electrode connected to the drain electrode through a contact hole. The common electrode is formed with another groove in a region of the contact hole for connecting the thin film transistor to the pixel electrode.

In one or more embodiments, a pixel electrode is formed over the common electrode.

In one or more embodiments, each of the pixels is operated by fringe field switching (FFS).

In one or more embodiments, each of the pixels further includes a common line formed with the same material as the gate line and connected to the common electrode through a contact hole.

Embodiments also relate to a method of fabricating a liquid crystal display device. A gate line is formed on a substrate. A gate insulation layer is formed at least on the gate line. A data line is formed on the gate insulation layer. A planarization layer is formed over the substrate, gate line, and the data line. On the planarization layer, a common electrode is formed with a plurality of perforations along the data line. Each of the perforations has a width narrower than a width of the data line. Material of the common electrode is absent from the plurality of perforations to reduce capacitance between the common electrode and the data line.

In one or more embodiments, a common line is formed in a same layer as the gate line. A contact hole for connecting the common electrode to the common line is formed after forming the planarization layer.

In one or more embodiments, the common electrode is formed by forming a metal layer on the planarization layer. A photoresist is formed over the formed metal layer, and a photolithographic process is performed using a mask on the formed metal layer coated with the photoresist.

In one or more embodiments, a pixel electrode is formed after forming the common electrode.

In one or more embodiments, a gate electrode of a thin film transistor is formed. The gate insulation layer is formed on the gate electrode. A drain electrode and a source electrode of the thin film transistor are formed. The planarization layer is formed on the drain electrode and the source electrode. An insulation layer is formed on the common electrode and the pixel electrode is formed on the insulation layer. A contact hole for connecting the pixel electrode to the drain electrode is formed after forming the insulation layer.

In one or more embodiments, the common electrode is formed with a groove in a region where a contact hole for connecting the pixel electrode to the drain electrode is formed.

BRIEF DESCRIPTION OF THE DRAWINGS

The accompanying drawings illustrate embodiments of the present disclosure and together with the description serve to explain the disclosure. In the drawings.

DETAILED DESCRIPTION OF THE EMBODIMENTS

Figure 1:
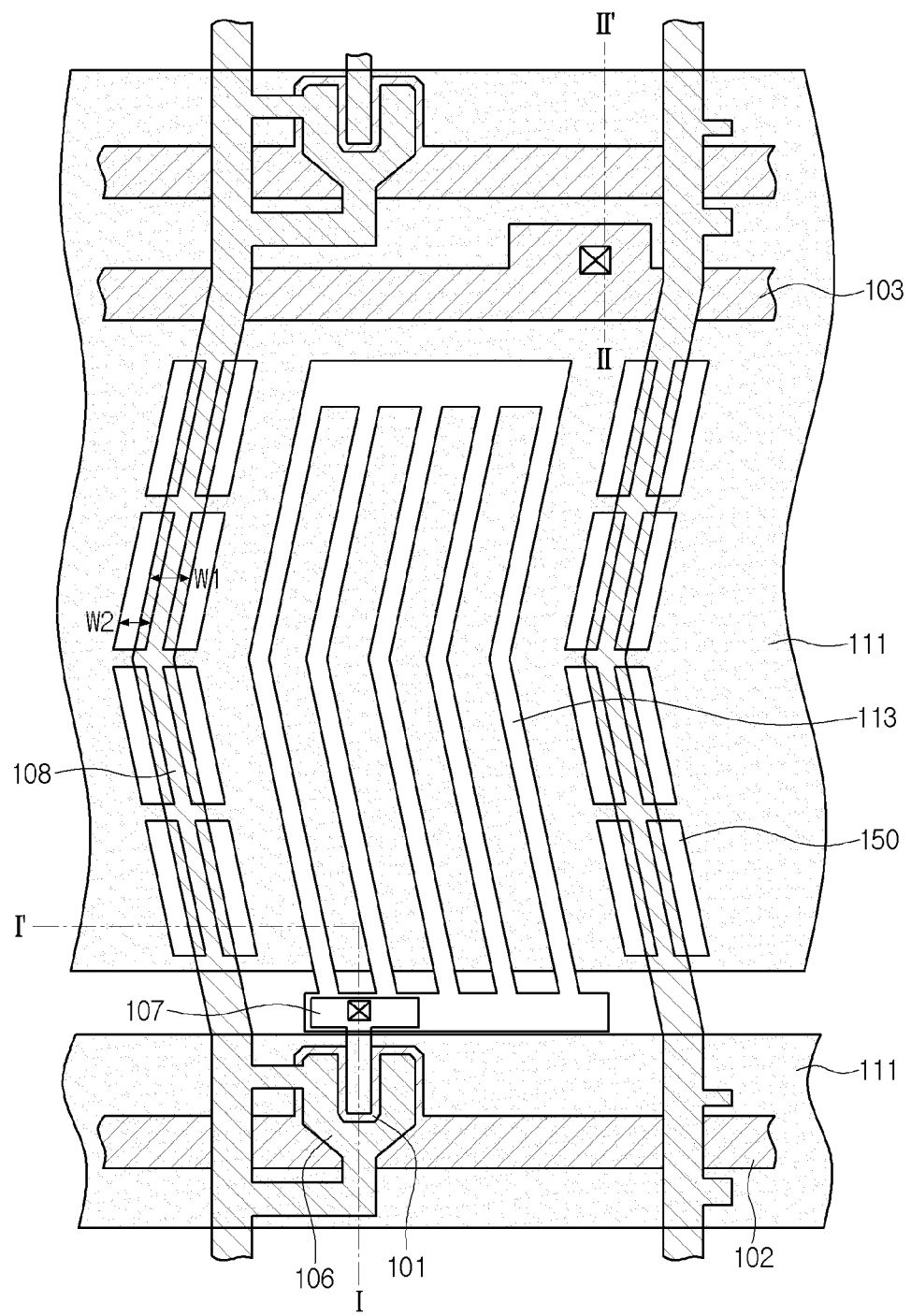
FIG. 1 is a planar view showing an LCD device according to an embodiment of the present disclosure.

Reference will now be made in detail to embodiments of the present disclosure, examples of which are illustrated in the accompanying drawings. These embodiments introduced hereinafter are provided as examples in order to convey their spirits to the ordinary skilled person in the art. Therefore, these embodiments might be embodied in a different shape, so are not limited to these embodiments described here. In the drawings, the size, thickness and so on of a device can be exaggerated for convenience of explanation. Wherever possible, the same reference numbers will be used throughout this disclosure including the drawings to refer to the same or like parts.

FIG. 1 is a plan view showing an LCD device according to an embodiment of the present disclosure. The LCD device according to an embodiment of the present disclosure includes, among others, an insulation substrate 100 including a display area and a non-display area. A gate line 102 extending in a horizontal direction is formed on the insulation substrate 100. A gate electrode 101 branching from the gate line 102 is also formed on the insulation substrate 100. A common line 103 parallel to the gate line 102 is formed in the same layer as the gate line 102. The common line 103 can be formed from the same material as the gate line 102.

A data line 108 is formed with a gate insulation layer between the data line 108 and the gate line 102. The data line 108 extends perpendicularly to the gate line 102 and defines a pixel region in conjunction with the gate line 102. A thin film transistor is formed in an intersection of the gate line 102 and the data line 108.

The thin film transistor is formed of the gate electrode 101, a semiconductor layer, a source electrode 106 and a drain electrode 107. The semiconductor layer is formed on the gate insulation layer at a location opposite to the gate electrode 101. The source electrode 106 branches off from the data line 108. A planarization layer is formed on the entire surface of the substrate 100 provided with the thin film transistor. A common electrode 111 is formed on the planarization layer.

The common electrode 111 can be formed on the top surface of the substrate 111 except at perforations 150 in a region along which the data lines 108 extend. A groove or perforation described herein refers to a portion of the liquid crystal display where material of the common electrode 111 is not formed. The common electrode 111 extends through a contact hole to come in contact with the common line 103. Also, each of a plurality of perforations 150 has a width $W_2$ narrower than the width $W_1$ of the data line 108. Due to the perforations 150, the common electrode 111 and data line 108 overlap vertically over a smaller area, and hence, the capacitance between the data line 108 and the common electrode 111 can be reduced. Among other advantages, the reduction of the capacitance results in reduced delay of a signal transmitted along the data line 108. Further, the perforations 150 formed in the common electrode 111 does not cause light leakage because the perforations 150 do not extend beyond the data line 108 which blocks light.

The thin film transistor applies a data signal from the data line 108 to a pixel electrode 113 in response to receiving a gate signal from the gate line 102. The pixel electrode 113 disposed in the pixel region is surrounded by two gate lines 102 and two data lines 108. The pixel electrode 113 can be formed from a material with a high light transmittance. The pixel electrode 113 can be formed with an insulation layer between the pixel electrode 113 and the common electrode 111. Furthermore, the pixel electrode 113 is connected to the drain electrode 107 of the thin film transistor via a contact hole.

The common electrode 111 is not formed on regions where the contact hole connecting the pixel electrode 113 and the drain electrode 107 are formed. Preferably, the perforations 150 are formed along the regions of the liquid crystal display corresponding to the region of the contact hole for connecting the pixel electrode 113 and the drain electrode 107. As such, the direct contact of the common electrode 111 and the pixel electrode 113 through the contact hole can be prevented.

The embodiment of LCD device described with reference to FIG. 1 is an FFS device that includes the common electrode 111 of a plate shape and the pixel electrode 113 of a finger shape, formed with the insulation layer between the common electrode 111 and the pixel electrode 113. As such, an aperture ratio can be enhanced and the resistance of the common electrode 111 can be reduced. Also, regions in the common electrode 111 of the plate shape are formed with perforations 150 and hence, only a small region of the common electrode 111 overlaps with the data line 108. Such reduced overlap of the common electrode 111 and the data line 108 decreases the capacitance between the common electrode 111 and the data line 108, reducing the delay of a signal through the data line 108 and prevent insufficient charging of capacitors in the pixels.

Figure 2A:
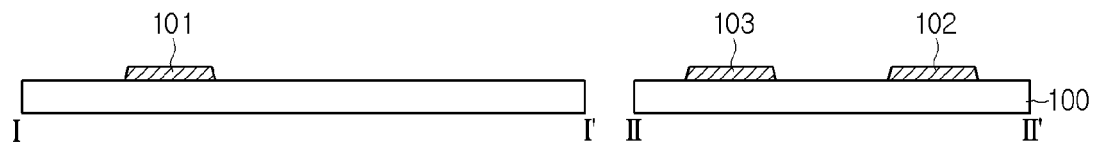
FIGS. 2A through 2F are cross-sectional views illustrating a method of fabricating an LCD device according to an embodiment of the present disclosure.

FIGS. 2A through 2F are cross-sectional views illustrating a method of fabricating an LCD device according to an embodiment of the present disclosure. Referring to FIG. 2A, a gate line 102, a common line 103 and a gate electrode 101 branching from the gate line 102 are formed on an insulation substrate 100. In order to form the gate electrode 101, the gate line 102 and the common line 103, a gate metal layer is formed on the insulation substrate 100 and a first photoresist pattern is formed on the gate metal layer.

Subsequently, the gate metal layer is etched using the photoresist pattern as a mask, thereby forming the gate electrode 101, the gate line 102 and the common line 103. The first photoresist pattern is prepared by forming a photoresist on the gate metal layer and patterning the photoresist through exposure and development processes. The exposure process uses a mask including transmission portions and blocking portions.

The insulation substrate 100 can be formed of materials such as glass, plastic material and polyimide (PI). The gate metal layer can become a single layer which is formed from materials such as molybdenum (Mo), titanium (Ti), tantalum (Ta), tungsten (W), copper (Cu), chromium (Cr), aluminum (Al) and alloys thereof. Alternatively, the gate metal layer can be formed in a multilayer structure of the above-mentioned metal layer and at least one transparent layer. The transparent layer can be formed from indium-tin-oxide (ITO), indium-zinc-oxide (IZO) and indium-tin-zinc-oxide (ITZO). It is shown in the drawings that the gate electrode 101, the gate line 102 and the common line 103 are formed in a single metal layer, but the present disclosure is not limited to this. In other words, the gate electrode 101, the gate line 102 and the common line 103 can be formed in a multilayer structure which includes at least two metal layers.

Figure 2B:
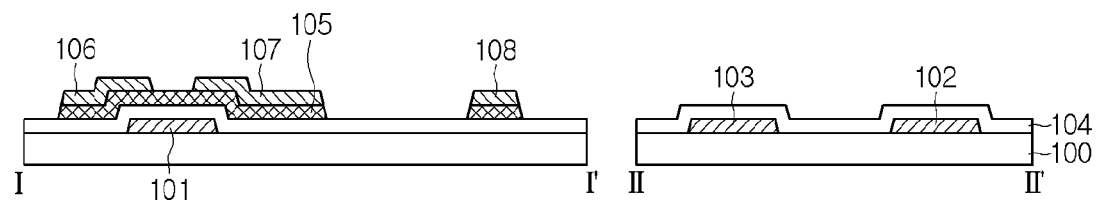

As shown in FIG. 2B, a gate insulation layer 104 is formed on the entire surface of the substrate 100 in which the gate electrode 101, the gate line 102 and the common line 103 are formed. Also, a semiconductor material is coated on the gate insulation layer 104, and a source/drain metal layer is stacked on the semiconductor material layer. Moreover, a second photoresist pattern with a height difference is formed on the source/drain metal layer through a photolithography procedure which uses one of a half-tone mask and a diffractive mask.

The second photoresist pattern has a small height in a region opposite to a channel region of a semiconductor layer 105 and a large height in another region opposite to a source electrode 106, a drain electrode 107 and a data line 108. The source/drain metal layer and the semiconductor material layer are sequentially etched through a phased etching process, in order to form the source electrode 106, the drain electrode 107, the data line 108 and the semiconductor layer 105.

In this way, the semiconductor layer 105, the source electrode 106, the drain electrode 107 and the data line 108 can be formed through a mask procedure. As such, the data line 108 can be formed in a dual-layer stack structure of the semiconductor material layer and the source/drain metal layer.

Alternatively, the semiconductor layer 105 can be formed by coating the semiconductor material layer on the gate insulation layer 104 and patterning the semiconductor material layer through a mask procedure. Thereafter, the source electrode 106, the drain electrode 107 and the data line 108 can be formed by depositing the source/drain metal layer on the substrate 100 provided with the semiconductor layer 105 and patterning the source/drain metal layer through another mask procedure. In other words, the formation of the semiconductor layer 105 and the formation of the source and drain electrodes 106 and 107 and the data line 108 can be performed using separated mask procedures. In this case, the data line 108 can be formed in a single layer structure of the source/drain metal layer.

Although not shown in the drawings, the semiconductor layer 105 can be formed to have an active layer and an ohmic contact layer. The source/drain metal layer can be formed from one of molybdenum (Mo), titanium (Ti), tantalum (Ta), tungsten (W), copper (Cu), chromium (Cr), aluminum (Al) and alloys thereof. Alternatively, the source/drain metal layer can be formed from a transparent conductive material such as indium-tin-oxide (ITO). Although source/drain metal layer is illustrated as a single metal layer in FIG. 2B, the source/drain metal layer can be formed by stacking at least two metal layers.

In this way, a thin film transistor including the gate electrode 101 branching from the gate line 102, the semiconductor layer 105 formed on the gate insulation layer 104 opposite to the gate electrode 101, the source electrode 106 formed on the semiconductor layer 105 and branching from the data line 108, and the drain electrode 107 formed on the semiconductor layer 105 can be completed. The thin film transistor is formed at an intersection of the gate line 102 and the data line 108.

Figure 2C:
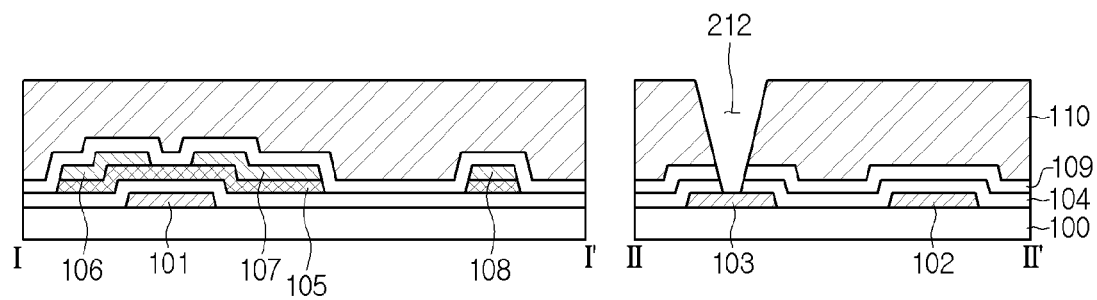

Referring to FIG. 2C, a passivation layer 109 and a planarization layer 110 are sequentially stacked on the surface of the substrate 100 provided with the source and drain electrodes 106 and 107 and the data line 108. Alternatively, the passivation layer 109 can be omitted. In other words, only the planarization layer 110 may serve as a passivation layer and can be formed on the surface of the substrate 100 provided with the source and drain electrodes 106 and 107 and the data line 108.

Also, a first contact hole 212 penetrating through the planarization layer 110, the passivation layer 109 and the gate insulation layer 104 is formed in a region where the common line 103 is formed to expose the common line 103 through the first contact hole 212.

Figure 2D:
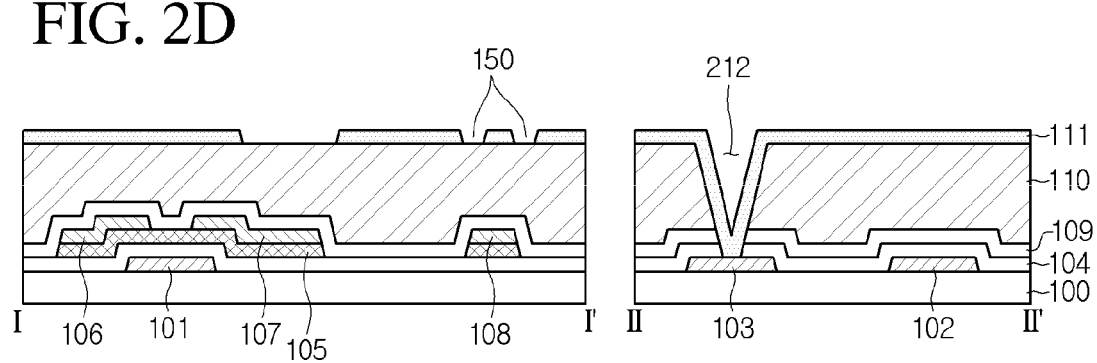

As shown in FIG. 2D, a metal layer is formed on the surface of the substrate 100 provided with the first contact hole 212. The metal layer can be formed in contact with the exposed common line 103. As such, a common electrode 111 can be electrically connected to the common line 103 through the first contact hole 212.

A third photoresist pattern is formed on the metal layer by coating a photoresist on the metal layer and performing photolithographic processes using a second mask. The third photoresist pattern can expose a portion of the metal layer opposite to the data line 108. Also, the third photoresist pattern can expose another portion of the metal layer opposite to the drain electrode 107.

The exposed metal layer is etched, and the third photoresist pattern is removed. In accordance therewith, regions in the common electrode 111 of a plate shape are formed with a plurality of perforations 150.

Perforations 150 are formed in a region corresponding to the data line 108. The perforations 150 formed in the region of the data line 108 have widths narrower than that of the data line 108. In other words, the perforations 150 formed within the common electrode 111 remove or reduce parasitic capacitance by reducing the overlapping of the common electrode 111 and the data line 108.

Also, groove 222 can be formed in another region corresponding to the drain electrode 107 to reduce parasitic capacitance between the drain electrode 107 and common electrode 111. Preferably, the groove 222 formed within the drain electrode 107 at a region of a second contact hole for connecting the drain electrode 107 with a pixel electrode (shown as 113 in FIG. 2F) formed subsequently. When the pixel electrode 113 connected to the drain electrode 107 through the second contact hole is formed, the groove 222 formed within the drain electrode 107 can prevent a direct contact of the common electrode 111 and the pixel electrode 113.

Figure 2E:
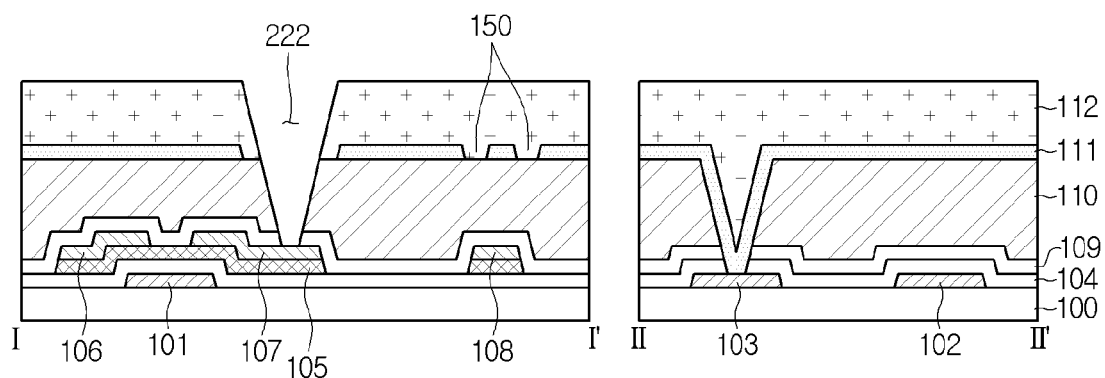

Referring to FIG. 2E, an insulation layer 112 is formed on the common electrode 111. Subsequently, the second contact hole 222 is formed by sequentially etching the insulation layer 112, the planarization layer 110 and the passivation layer 109 within the region of the drain electrode 107. The second contact hole 222 exposes a part of the drain electrode 107. Meanwhile, the common electrode 111 is not exposed through the second contact hole, because the common electrode 111 is removed from in the formation region of the second contact hole.

Figure 2F:
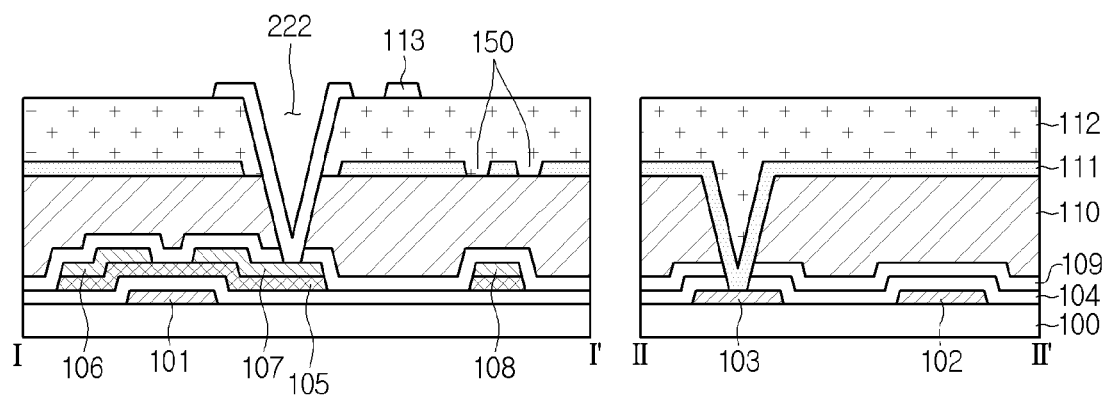

As shown in FIG. 2F, the pixel electrode 113 is formed on the insulation layer 112. In other words, the pixel electrode 113 and the common electrode 111 are formed with the insulation layer 112 between the pixel electrode 113 and the common electrode 111. The pixel electrode 113 is electrically connected to the drain electrode 107 of the thin film transistor through the second contact hole 222. Also, the pixel electrode 113 is disposed in a pixel region, which is defined by the gate line 102 and the data line 108, and formed in a finger shape. Moreover, the pixel electrode 113 can be formed from a material with a high light transmittance.

The common electrode 111 is not formed on a region where the second contact hole 222 is to be formed. As such, the common electrode 111 is not exposed through the second contact hole 222. Therefore, the pixel electrode 113 can be formed without directly contacting the common electrode 111.

Although not shown in the drawings, an additional substrate facing the substrate 100 provided with the thin film transistor, the common electrode 111 and the pixel electrode 113 can be prepared. The additional substrate can be a color filter array substrate. The color filter array substrate can be formed by sequentially stacking a black matrix, a color filter layer and an overcoat layer.

The black matrix shields light leaking from the pixel region to the other regions except the pixel region. To this end, the black matrix is formed in a matrix shape. The color filter layer is formed between the black matrix. Also, the color filter layer includes red, green and blue color filters. The overcoat layer is formed on the color filter layer and used to planarize the surface of the color filter array substrate.

The substrate 100 and the additional substrate can be combined with each other in such a manner as to have a liquid crystal layer therebetween, thereby forming a panel. The liquid crystal layer can be driven by an electric field formed between the common electrode 111 and the pixel electrode which are formed with having the insulation layer 112 therebetween. In detail, liquid crystal molecular alignment in the liquid crystal layer can be adjusted according to a direction of the electric field which is formed between the common electrode 111 and the pixel electrode 113.

As described above, the LCD device and its fabrication method according to the present disclosure employs the structure of an FFS mode. As such, an aperture ratio can be enhanced and the resistance of the common electrode 111 can be reduced. Also, the perforations 150 are provided within the common electrode in a region overlapping with the data line. In accordance therewith, the delay of a signal on the data line can be reduced, and the delayed or insufficient charging of capacitors in the pixels can be prevented.

Although the present disclosure has been limitedly explained regarding only the embodiments described above, it should be understood by the ordinary skilled person in the art that the present disclosure is not limited to these embodiments, but rather that various changes or modifications thereof are possible without departing from the spirit of the present disclosure. Accordingly, the scope of the present disclosure shall be determined only by the appended claims and their equivalents without being limited to the detailed description.

What is claimed is:

1. A liquid crystal display device comprising:
a gate line formed on an insulation substrate;
a data line formed to intersect with the gate line to define a pixel region;
a thin film transistor formed at an intersection of the gate line and the data line;
a planarization layer formed on the substrate, the data line and the thin film transistor;
a common electrode formed on the planarization layer, the common electrode formed with a plurality of perforations within a region corresponding to the data line, each of the perforations having a width smaller than a width of the data line, the plurality of perforations reducing capacitance between the data line and the common electrode;
a pixel electrode formed over the common electrode; and
a common line which is formed in a same layer and formed with a same material as the gate line and connected to the common electrode through a contact hole.

2. The liquid crystal display device of claim 1, wherein the common electrode is formed over an entire pixel region.

3. The liquid crystal display device of claim 1, wherein
the pixel electrode is connected to the thin film transistor through a contact hole, and
a groove is formed within a region of the contact hole for connecting the thin film transistor to the pixel electrode.

4. A method of fabricating a liquid crystal display device, the method comprising:
Forming, a common line, a gate line and a gate electrode branching from the gate line on an insulation substrate at a same time;
forming a gate insulation layer on the substrate formed with the gate line and the gate electrode;
forming a semiconductor layer, source and drain electrodes and a data line on the gate insulation layer;
forming a planarization layer on the substrate formed with the source and drain electrode and the data line;
forming a contact hole to connect the common electrode to the common line after forming the planarization layer;
forming, on the planarization layer, a common electrode;
forming a plurality of perforations in a region within the common electrode to reduce capacitance between the common electrode and the data line, each of the perforations having a width narrower than a width of the data line;
forming an insulation layer on the common electrode; and
forming a pixel electrode on the insulation layer.

5. The method of claim 4, wherein a contact hole is formed after forming the insulation layer to connect the pixel electrode to the drain electrode.

6. The method of claim 5, wherein the common electrode is formed to allow a groove to be formed within a region in the common electrode where the contact hole for connecting the pixel electrode and the drain electrode is formed.

7. A liquid crystal display device comprising an array of pixels, each of the pixels comprising:
a gate line;
a data line intersecting with the gate line to define a pixel region of each of the pixels in conjunction with the gate line; and
a common electrode formed with two rows of perforations extending along the data line, each of the perforations having a width narrower than a width of the data line, material of the common electrode absent from the perforations to reduce capacitance between the common electrode and the data line.

8. The liquid crystal display device of claim 7, wherein each of the pixels further comprises a planarization layer between the data line and the common electrode.

9. The liquid crystal display device of claim 7, wherein each of the pixels further comprises a thin film transistor at an intersection of the gate line and the data line, the thin film transistor comprising:
a gate electrode connected to the gate line,
a semiconductor layer over the gate electrode,
a source electrode connected to the data line, and
a drain electrode, the common electrode formed with a groove at a location corresponding to the drain electrode.

10. The liquid crystal display device of claim 9, further comprising a pixel electrode connected to the drain electrode through a contact hole, and wherein the common electrode is formed with another groove in a region of the contact hole for connecting the thin film transistor to the pixel electrode.

11. The liquid crystal display device of claim 7, further comprising a pixel electrode formed over the common electrode.

12. The liquid crystal display device of claim 7, wherein each of the pixels is operated by fringe field switching (FFS).

13. The liquid crystal display device of claim 7, wherein each of the pixels further comprises a common line formed with the same material as the gate line and connected to the common electrode through a contact hole.

14. A method of fabricating a liquid crystal display device, comprising:
forming a gate line on a substrate;
forming a gate insulation layer at least on the gate line;
forming a data line on the gate insulation layer;
forming a planarization layer over the substrate, gate line, and the data line;
forming, on the planarization layer, a common electrode within which two rows perforations are formed along the data line, each of the perforations having a width narrower than a width of the data line, material of the common electrode absent from the plurality of perforations to reduce capacitance between the common electrode and the data line.

15. The method of claim 14, further comprising:
forming a common line in a same layer as the gate line, and
forming a contact hole for connecting the common electrode to the common line, after forming the planarization layer.

16. The method of claim 14, wherein forming the common electrode comprises:
forming a metal layer on the planarization layer,
coating a photoresist over the formed metal layer, and
performing a photolithographic process using a mask on the formed metal layer coated with the photoresist.

17. The method of claim 14, further comprising forming a pixel electrode after forming the common electrode.

18. The method of claim 17, further comprising:
forming a gate electrode of a thin film transistor, the gate insulation layer formed on the gate electrode;
forming a drain electrode and a source electrode of the thin film transistor, the planarization layer formed on the drain electrode and the source electrode;
forming an insulation layer on the common electrode, the pixel electrode formed on the insulation layer; and
forming a contact hole for connecting the pixel electrode to the drain electrode after forming the insulation layer.

19. The method of claim 18, wherein the common electrode is formed with a groove in a region where a contact hole for connecting the pixel electrode to the drain electrode is formed.

* * * * *